US011375244B2

(12) United States Patent
Gao et al.

(10) Patent No.: US 11,375,244 B2
(45) Date of Patent: Jun. 28, 2022

(54) DYNAMIC VIDEO ENCODING AND VIEW ADAPTATION IN WIRELESS COMPUTING ENVIRONMENTS

(71) Applicant: Intel Corporation, Santa Clara, CA (US)

(72) Inventors: Jie Gao, Sunnyvale, CA (US); Wenyi Tang, Beijing (CN); Bo Qiu, Hillsboro, OR (US); Ulun Karacaoglu, San Diego, CA (US); Kristoffer Fleming, Chandler, AZ (US); Yunbiao Lin, Shanghai (CN); Yongfa Zhou, Beijing (CN); Yaniv Frishman, Kiryat Ono (IL); Manish Hiranandani, Fremont, CA (US); Xu Zhang, Beijing (CN); Sharon Talmor Marcovici, Kafar-Saba (IL); Jianwei Yang, Beijing (CN); Yu Yang, Beijing (CN); Yating Wang, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/958,260

(22) PCT Filed: Mar. 30, 2018

(86) PCT No.: PCT/CN2018/081235
§ 371 (c)(1),
(2) Date: Jun. 26, 2020

(87) PCT Pub. No.: WO2019/183914
PCT Pub. Date: Oct. 3, 2019

(65) Prior Publication Data
US 2021/0014539 A1    Jan. 14, 2021

(51) Int. Cl.
*H04N 21/218* (2011.01)
*H04N 21/2343* (2011.01)
(Continued)

(52) U.S. Cl.
CPC . *H04N 21/21805* (2013.01); *H04N 21/23439* (2013.01); *H04N 21/2662* (2013.01);
(Continued)

(58) Field of Classification Search
CPC ....... H04N 21/21805; H04N 21/23439; H04N 21/2662; H04N 21/4122; H04N 21/41407; H04N 21/42202; H04N 21/44029
See application file for complete search history.

(56) References Cited

U.S. PATENT DOCUMENTS

2017/0115488 A1* 4/2017 Ambrus .................. G06F 3/012

FOREIGN PATENT DOCUMENTS

| CN | 104243102 A | 12/2014 |
| CN | 105430532 A | 3/2016 |

(Continued)

OTHER PUBLICATIONS

International Search Report and Written Opinion received for International Application No. PCT/US2018/081235, Ref No. 182344PCWO dated Jan. 7, 2019, 9 pages.

*Primary Examiner* — Yassin Alata
(74) *Attorney, Agent, or Firm* — Jaffery Watson Mendonsa & Hamilton LLP

(57) ABSTRACT

An apparatus of embodiments, as described herein, includes one or more processors to track data associated with movement of a computing device accessible to a user, and evaluate the data and compare a latency with latency thresholds, where the data indicates the latency and the latency thresholds associated with a frame. The one or more pro- (Continued)

cessors are further to maintain a current video encoding rate, if the latency is lower than a first latency threshold and greater than a second latency threshold. The current video encoding rate is decreased if the latency is equal to or greater than the first latency threshold, where the current video encoding rate is increased if the latency is lower than the second latency threshold. The one or more processors are further to present the frame at the computing device including one or more of a wearable device and a mobile device.

21 Claims, 13 Drawing Sheets

(51) Int. Cl.
*H04N 21/2662* (2011.01)
*H04N 21/41* (2011.01)
*H04N 21/414* (2011.01)
*H04N 21/422* (2011.01)
*H04N 21/4402* (2011.01)

(52) U.S. Cl.
CPC ... *H04N 21/4122* (2013.01); *H04N 21/41407* (2013.01); *H04N 21/42202* (2013.01); *H04N 21/44029* (2013.01)

(56) References Cited

FOREIGN PATENT DOCUMENTS

| | | |
|---|---|---|
| CN | 106998409 A | 8/2017 |
| GB | 2540204 A | 1/2017 |

* cited by examiner

DYNAMIC VIDEO ENCODING AND VIEW ADAPTATION IN WIRELESS COMPUTING ENVIRONMENTS

CROSS-REFERENCE

This patent application is related to and, under 35 U.S.C. § 371, claims the benefit of and priority to International Application No. PCT/CN2018/081235, entitled DYNAMIC VIDEO ENCODING AND VIEW ADAPTATION IN WIRELESS COMPUTING ENVIRONMENTS, by Jie Gao, et al., filed Mar. 30, 2018, where the contents of which are incorporated herein by reference.

FIELD

Embodiments described herein relate generally to data processing and more particularly to facilitate dynamic video encoding and view adaptation in wireless computing environments.

BACKGROUND

With the growth in virtual reality (VR), augmented reality (AR), and mixed reality (MR), the communication between non-wearable computing devices, such as laptops, desktops, etc., and wearable computing devices, such as head mounted displays (HMDs), etc., also needs to improve. However, conventional techniques are not fully developed to deal with all issues relating to such communication, such as primitive immersion experience, high latency in wireless solutions, etc.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
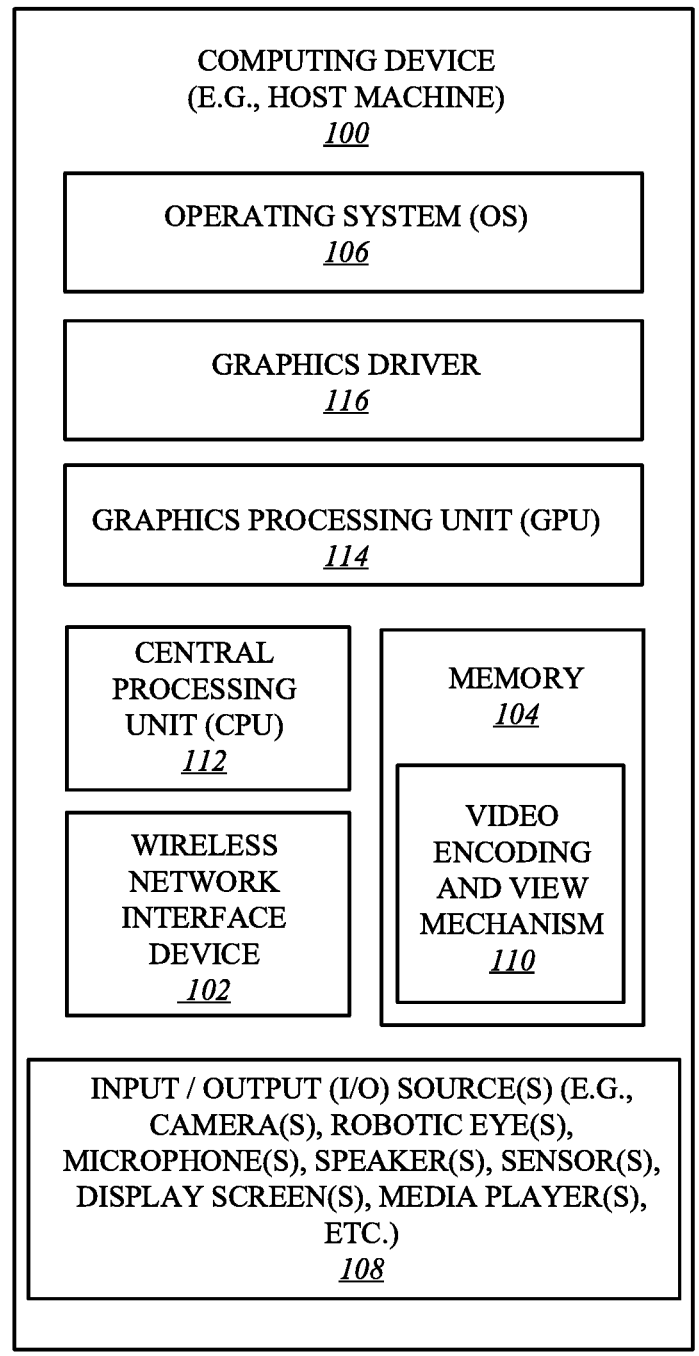
FIG. 1 illustrates a computing device employing a video encoding and view adapting mechanism according to one embodiment.

In the following description, numerous specific details are set forth. However, embodiments, as described herein, may be practiced without these specific details. In other instances, well-known circuits, structures and techniques have not been shown in detail in order not to obscure the understanding of this description.

Embodiments provide for a novel technique for dynamically changing the variable bit rate (VBR) for encoding based on wireless link bandwidth and motion tracking in VR applications. This novel technique can reduce the frame drop occurrences due to the reduced bandwidth, while making the wireless VR system increasingly robust.

Embodiments further provide for a novel technique for leveraging overdrawn images to reduce visual latency without having to increase encoding and decoding time, while minimizing the size of blank edge that the users typically observe.

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an application programming interface (API), such as a free rendering API, such as Open Graphics Library (OpenGL®), DirectX® 11, DirectX® 12, etc., where "dispatch" may be interchangeably referred to as "work unit" or "draw" and similarly, "application" may be interchangeably referred to as "workflow" or simply "agent". For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

It is to be noted that terms or acronyms like convolutional neural network (CNN), CNN, neural network (NN), NN, deep neural network (DNN), DNN, recurrent neural network (RNN), RNN, and/or the like, may be interchangeably referenced throughout this document. Further, terms like "autonomous machine" or simply "machine", "autonomous vehicle" or simply "vehicle", "autonomous agent" or simply "agent", "autonomous device" or "computing device", "robot", and/or the like, may be interchangeably referenced throughout this document.

FIG. 1 illustrates a computing device 100 employing a video encoding and view adapting mechanism ("encoding and adapting mechanism") 110 according to one embodiment. Computing device 100 represents a communication and data processing device including or representing any number and type of smart devices, such as (without limitation) smart command devices or intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet-based cable television set-top boxes, etc.), global positioning system (GPS)-based devices, etc.

In some embodiments, computing device 100 may include (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 100 may include a computer platform hosting an integrated circuit ("IC"), such as a system on a chip ("SoC" or "SOC"), integrating various hardware and/or software components of computing device 100 on a single chip.

As illustrated, in one embodiment, computing device 100 may include any number and type of hardware and/or software components, such as (without limitation) graphics processing unit ("GPU" or simply "graphics processor") 114, graphics driver (also referred to as "GPU driver", "graphics driver logic", "driver logic", user-mode driver (UMD), UMD, user-mode driver framework (UMDF), UMDF, or simply "driver") 116, central processing unit ("CPU" or simply "application processor") 112, memory 104, wireless network interface device ("wireless device") 102, drivers, or the like, as well as input/output (I/O) sources 108, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

In one embodiment, as illustrated, encoding and adapting mechanism 110 may be hosted by memory 104 in communication with operating system 106 and further in communication with I/O source(s) 108 of computing device 100. In another embodiment, encoding and adapting mechanism 110 may be hosted by or part of a wireless transmitter. In yet another embodiment, encoding and adapting mechanism 110 may be hosted or facilitated by graphics driver 116. In yet another embodiment, encoding and adapting mechanism 110 may be hosted by or part of graphics processing unit ("GPU" or simply graphics processor") 114 or firmware of graphics processor 114. For example, encoding and adapting mechanism 110 may be embedded in or implemented as part of the processing hardware of graphics processor 114. Similarly, in yet another embodiment, encoding and adapting mechanism 110 may be hosted by or part of central processing unit ("CPU" or simply "application processor") 112. For example, encoding and adapting mechanism 110 may be embedded in or implemented as part of the processing hardware of application processor 112.

In yet another embodiment, encoding and adapting mechanism 110 may be hosted by or part of any number and type of components of computing device 100, such as a portion of encoding and adapting mechanism 110 may be hosted by memory 104 or part of operating system 116, another portion may be hosted by or part of graphics processor 114, another portion may be hosted by or part of application processor 112, while one or more portions of encoding and adapting mechanism 110 may be hosted by or part of operating system 116 and/or any number and type of devices of computing device 100. It is contemplated that embodiments are not limited to any implementation or hosting of encoding and adapting mechanism 110 and that one or more portions or components of encoding and adapting mechanism 110 may be employed or implemented as hardware, software, or any combination thereof, such as firmware.

Computing device 100 may host network wireless interface(s) to provide access to a network, such as WiGig (IEEE 802.11ad /802.11ay) or WiFi (IEEE 802.11ac/802.11ax) a LAN, a wide area network (WAN), a metropolitan area network (MAN), a personal area network (PAN), Bluetooth, a cloud network, a mobile network (e.g., $3^{rd}$ Generation (3G), $4^{th}$ Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable. Further, wireless device 102 may be based on one or more wireless communications technologies, such as WiGig, WiFi, etc., and used for transmitting of encoded videos to other computing devices, such as computing device 250 of FIG. 2.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "computing device", "computing device computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 2:
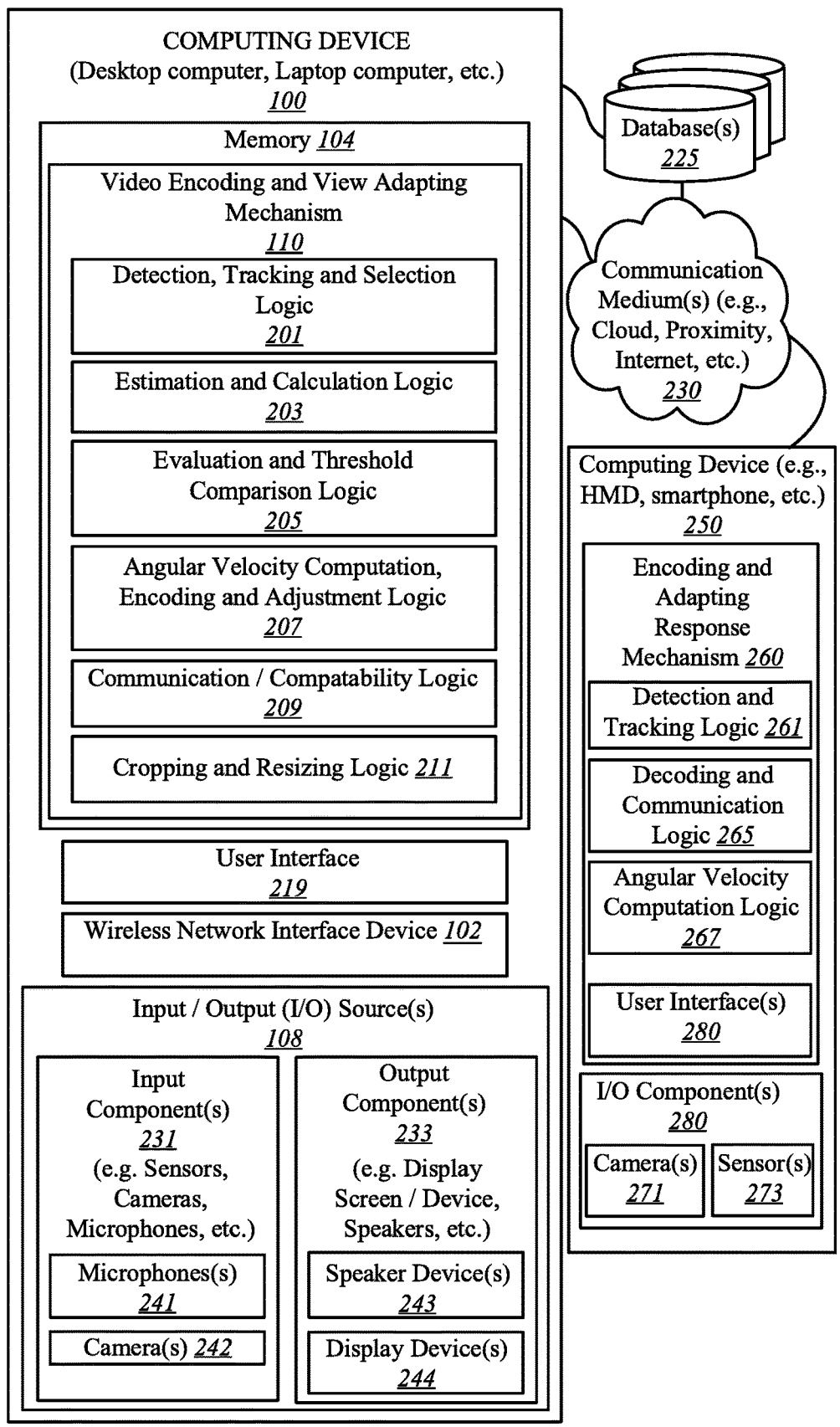
FIG. 2 illustrates the video encoding and view adapting mechanism of FIG. 1 and an encoding and adapting response mechanism according to one embodiment.

FIG. 2 illustrates the video encoding and view adapting mechanism 110 of FIG. 1 and an encoding and adapting response mechanism ("response mechanism") 260 according to one embodiment. For brevity, many of the details already discussed with reference to FIG. 1 are not repeated or discussed hereafter. In one embodiment, encoding and adapting mechanism 110 may include any number and type of components, such as (without limitations): detection, tracking, and selection logic ("DTS logic") 201; estimation and calculation logic 203; evaluation and threshold comparison logic 205; angular velocity computation, encoding, and adjustment logic ("CEA logic") 207; communication/compatibility logic 209; and cropping and resizing logic 211. Computing device 100 is further shown as having wireless network interface device 102 for transmitting encoded videos to computing device 250, where computing device 100 may employ or run one or more pertinent applications, such as motion tracking and/or sensor fusion applications, etc.

Similarly, response mechanism 260 at computing device 250 (e.g., HMD, other wearable devices, etc.) includes any number and type of components, such as (without limitations): detection and tracking logic 261; decoding and communication logic 265; and angular velocity computation logic 267.

It is contemplated that embodiments are not limited to any set or placement of components, such as one or more components 201, 203, 205, 207, 209, 211 of encoding and adapting mechanism 110 may reside on either or both of computing device 100 and HMD 250; similarly, one or more components 261, 265, 267 of response mechanism 260 may reside on either or both of computing device 100 and HMD 250.

Computing device 250 (hereinafter also referenced as "HMD" or "wearable device") is further shown to have I/O component(s) 270 including camera(s) 271, sensor(s) 273 (e.g., inertial measurement unit (IMU) sensors), microphone(s), speaker(s), etc. HMD 250 is further shown as offering user interface(s) 280 (e.g., graphical user interface (GUI)-based user interface, Web browser, cloud-based platform user interface, software application-based user interface, application programming interfaces (API), etc.). As with computing device 100, HMD 250 may also include or employ one or more wireless network interface devices or radios based on one or more wireless communications technologies, such as WiFi, WiGig, etc.

It is contemplated that embodiments are not limited to the illustrated one computing device 100 in communication with a single HMD 250 and that in other embodiment, any number and type of computing devices, like computing device 100, may be in communication with any number and type of HMDs, such as HMD 250.

In one embodiment, computing device 100 may include any number and type of devices, such as desktop computers, laptop computers, mobile devices (e.g., smartphones, tablet computers, etc.), etc., in communication with HMD 250 over communication medium(s) 230, such as a cloud network, a proximity network, the Internet, etc. In some embodiments, computing device 100 may include a server computer, such as a cloud server computer, in communication with HMD 250 communication medium(s) 230.

As with encoding and adapting mechanism 110, response mechanism 260 is not limited in how it is used and implemented, such as whether any component or all of response mechanism 260 is hosted by or part of memory, GPU, CPU, or any combination thereof at HMD 250. Similarly, one or more portions or components of response mechanism 260 may be employed or implemented as hardware, software, or any combination thereof, such as firmware.

Computing device 100 is further shown to include user interface 219 (e.g., GUI-based user interface, Web browser, cloud-based platform user interface, software application-based user interface, API, etc.). Computing device 100 may further include I/O source(s) 108 having input component(s) 231, such as camera(s) 242 (e.g., surveillance cameras, CCTV cameras, search cameras, Intel® RealSense™ cameras), sensors, microphone(s) 241, etc., and output component(s) 233, such as display device(s) or simply display(s) 244 (e.g., integral displays, tensor displays, projection screens, display screens, etc.), speaker devices(s) or simply speaker(s) 243, etc. Similarly, HMD 250 may include I/O component(s) 270 including all forms and type of input devices (e.g., camera(s) 271, sensors, microphones, etc.) and output devices (e.g., speaker devices, display devices/screens, etc.)

Computing device 100 is further illustrated as having access to and/or being in communication with one or more database(s) 225 over one or more communication medium(s) 230 (e.g., networks such as a cloud network, a proximity network, the Internet, etc.). In some embodiments, database(s) 225 may include one or more of storage mediums or devices, repositories, data sources, etc., having any amount and type of information, such as data, metadata, etc., relating to any number and type of applications, such as data and/or metadata relating to users, estimations, computations, thresholds, decisions, physical locations or areas, applicable laws, policies and/or regulations, user preferences and/or profiles, security and/or authentication data, historical and/or preferred details, and/or the like.

As aforementioned, computing device 100 may host I/O sources 108 including input component(s) 231 and output component(s) 233. In one embodiment, input component(s) 231 may include a sensor array including, but not limited to, microphone(s) 241 (e.g., ultrasound microphones), camera(s) 242 (e.g., two-dimensional (2D) cameras, three-dimensional (3D) cameras, infrared (IR) cameras, depth-sensing cameras, surveillance cameras, etc.), capacitors, radio components, radar components, scanners, and/or accelerometers, etc. Similarly, output component(s) 233 may include any number and type of speaker(s) 243, display device(s) 244 (e.g., screens, projectors, light-emitting diodes (LEDs)), and/or vibration motors, etc.

For example, as illustrated, input component(s) 231 may include any number and type of microphones(s) 241, such as multiple microphones or a microphone array, such as ultrasound microphones, dynamic microphones, fiber optic microphones, laser microphones, etc.

It is contemplated that one or more of microphone(s) 241 serve as one or more input devices for accepting or receiving audio inputs (such as human voice) into computing device 100 and converting this audio or sound into electrical signals. Similarly, it is contemplated that one or more of camera(s) 242 serve as one or more input devices for detecting and capturing of image and/or videos of scenes, objects, etc., and provide the captured data as video inputs into computing device 100.

Similarly, at HMD 250, camera(s) 271 and other input components, such as sensors, microphones, etc., may be used to detect scenes, sounds, and other data for estimation and computation of parameters that can then be used for dynamic encoding of videos and adaptation of views as described throughout this document. It is contemplated that embodiments are not limited to any number or type of microphone(s) 241, camera(s) 242, 271, speaker(s) 243, display(s) 244, etc.

As aforementioned, VR and AR markets are driving higher refresh rates, while keeping the amount of change between individual frames as small as possible. Thus, significant benefit of necessary wireless bandwidth may be achieved by using temporal compression which relies on the scene changes, where VBR preserves the image quality better than constant bit rate (CBR). It is contemplated that in computing and telecommunications, VBR relates to the bitrate used in sounds and video encoding, while CBR relates to the quality of service as compared to VBR. Although much of the discussion in this document relates to an intra-frame encoding, which involves each video frame being encoded separately without taking past video frames into account, it is contemplated that embodiments not limited in their application or use merely to intra-frame encoding. It is to be noted that embodiments are applicable to and useable with both intra-frame and inter-frame encoding schemes, where inter-frame encoding involves inter frame prediction to benefit from temporal redundancy between neighboring frames enabling higher compression rates. Further, for example, VBR (as opposed to CBR) encoding can be used with both intra-frame and inter-frame encoding cases.

Embodiments provide for a novel technique for cross layer optimization in computing platform, including VBR encoders, HMD tracking in VR applications, wireless components, etc., based on one or more of the following observations: 1) scene changes are proportional to HMD motions and in a VR usage model, video content is rendered based on a new user pose, where high motion can cause rapid scene change; and 2) in VBR compression mode, the compressed frame size is related to the level of scene change, where rapid scene change increases the encoded frame size and results in a longer wireless transmission time. In a latency fixed wireless VR system, this may cause a frame drop if the frame arrives too late to present at a receiving device (Rx), such as HMD 250.

In one embodiment, a novel technique is provided to dynamically change the VBR encoding rate based on wireless link bandwidth and motion tracking in VR applications. This novel technique allows for reduction in frame drop occurrences that are due to the reduced bandwidth, while allowing the wireless VR systems to be more robust. In one embodiment, wireless transmission latency is estimated with the current frame size after VBR encoding. Since fast HMD motion or rapid scene change increased the frame size and causes long wireless latencies, this novel technique provides for reduction in VBR encoder rate in order to receive the new frame in time at the receiving device, such as HMD 250, while avoiding repeated frame. Further, for example, for WiGig and other wireless communication technologies which employ beam forming, any movement can present a challenge since wireless bitrates are typically reduced during movement since the radio may need to perform beamforming. Thus, in such cases, detecting HMD movement and proactively reducing the wireless bitrate can help avoid frame drops.

In conventional video encoding systems, video content is independent from the user motion and thus conventional techniques do not work with motion data to optimize video encoding.

VR usage is unique in that a scene change is proportional to the HMD motion and any video content is rendered based on the new user pose, where high HMD motion can cause rapid scene changes. These rapid scene changes increase the encoded frame sizes and result in longer wireless transmission time, such as in a latency fixed wireless VR system, this may cause a frame drop if such frame arrives too late to present at the receiving device.

In one embodiment, detection and tracking logic 261 at HMD 250 may be used to track motion speed (v) of HMD 250 with respect to various movements, such as the intentional or unintentional movement of the head of the user wearing HMD 250, etc. For example, detection and tracking logic 261 may use camera(s) 271, IMU sensor(s) 273, etc., to continuously detect and track any movement of HMD 250 to collect all the pertinent data associated with the movement of HMD 250 and then provide that data to estimation and calculation logic 203 for further computation like estimation of target bitrate to be used (based on movement), such as estimation of frame size ($S(v, E)$), where E is the current encoder rate, calculate frame transmission latency (L=S/B), where B is the wireless link throughput, where VBR encoding rate is changed if L exceeds a predetermined threshold (L_threshold) as facilitated by evaluation and threshold logic 205 at computing device 100 upon receiving the relevant data from HMD 250 as facilitated by decoding and communication logic 265. The relevant data may include (but not limited to) motion tracking (v, E), frame size estimation (S) with current VBR rate, calculated wireless latency (L) associated with HMD 250, etc. This novel technique allows for reduction in frame drop occurrences and making wireless VR systems increasingly robust.

As previously described, in conventional techniques, given the frames transmission latency (e.g., 12 msec) that is required due to increased frame size with rapid motion, dropping of frames is a usual occurrence and such frames are not delivered or displayed on time. For example, as shown in Table 1 below, conventional techniques experience frame drops because the latency, L, is greater than the threshold.

In contrast, embodiments provide for novel technique for adjusting the latency such that the latency equals the threshold and thus all frames are presented without any drops.

TABLE 1

| HMD Motion Speed | Conventional Technique (frame drops) | Novel Technique (no frame drop) |
| --- | --- | --- |
| | Encoded frame size: 800 KB | Encoded frame size: 625 KB |
| 200°/sec | Latency (L): 12.8 msec<br>L threshold: 10 msec | Latency (L): 10 msec<br>L threshold: 10 msec |

Figure 3A:
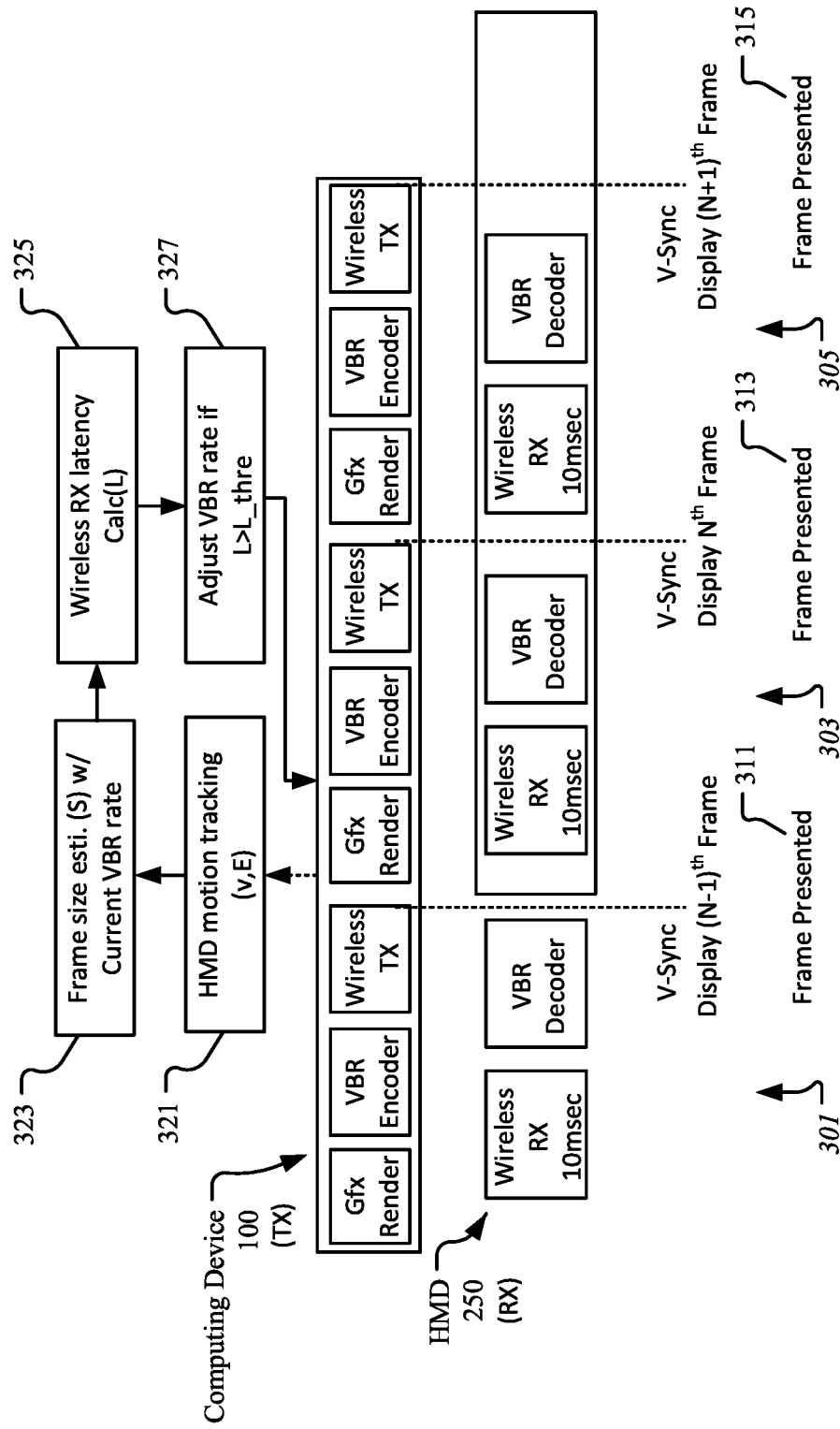
FIG. 3A illustrates an architectural setup facilitating a transaction sequence for encoding of video and transmission and presentation of frames according to one embodiment.

As further illustrated and discussed with respect to FIG. 3A, in one embodiment, new video encoding rate is used based on S(v) to reduce the encoded frame size and finish the frame transmission within 10 msec such that the frame is received, decoded, and displayed in time. For example, once the HMD motion speed is detected by detection and tracking logic 261 at HMD 250, and the next frame size is estimated by estimation and calculation logic 203 at computing device 100. Then, the size and other pertinent data may be put together and offered from HMD 250 to computing device 100 using decoding and communication logic 265.

In one embodiment, the pertinent data, including the size, motion speed, etc., is received by DTS logic 201 at computing device 100, over communication medium(s) 225, as facilitated by communication/compatibility logic 209, the data is then evaluated by evaluation and threshold comparison logic 205. For example, evaluation and threshold comparison logic 205 may evaluate the data and calculate transmission latency of the next frame (L) based on S and wireless link bandwidth (B). In one embodiment, this calculated latency is then matched with or compared to a predetermined latency threshold to determine whether an adjustment to the VBR encoding rate is necessitated.

It is contemplated that the threshold may be pre-computed based any number and type of factors, such as buffer, memory resources, type of HMD 250, overall system resources, type of movement, type of application, and/or the like, and accordingly, this threshold may be dynamically defined and computed in that it can change from time to time or device to device as desired or necessitated.

In one embodiment, upon comparing the computed latency to the latency threshold, evaluation and threshold comparison logic 205 determines whether the latency is greater than, equal to, or less than the threshold. If the latency is determined to equal to or less than the threshold, then the process continues with the current VBR encoding rate at E and the computed latency. If, however, the latency breaches the threshold, then the VBR encoding rate is adjusted to a new rate (E_new) based on the threshold (L_threshold), size of the frame (S), and the wireless link bandwidth (B) so that the next frame is presented as opposed to being dropped as facilitated by CEA logic 207.

Embodiments further provide for a novel technique to leverage overdrawn images to reduce visual latency without increasing encode or decode time, while minimizing the size of back end that the users typically get to observe. This novel technique provides for a dynamic field of view adaptation to reduce latency for wireless virtual reality.

Conventional techniques require overdrawn images with larger field of view (FOV) and re-project the image to the latest position before displaying it on the screen. However, if an overdrawn image cannot fill up the reprojection position, then the users see blank edges. Conventional techniques are limited in that they require extra expensive hardware and do not support reprojection because doing so would introduce large blank edges due to high latency of such techniques.

Figure 3B:
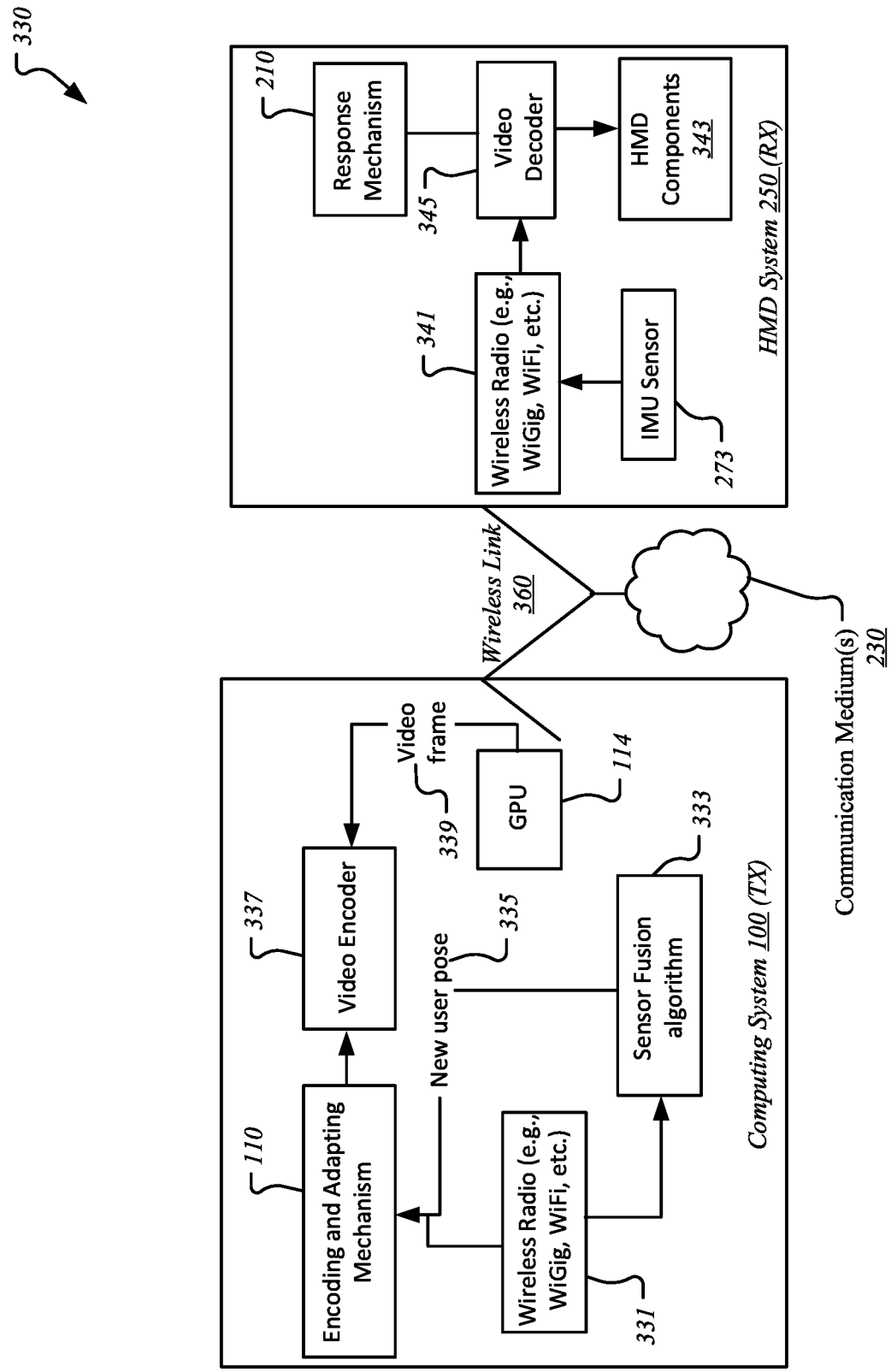
FIG. 3B illustrates an architectural setup for facilitating encoding of video and transmission and presentation of frames according to one embodiment.
Figure 3C:
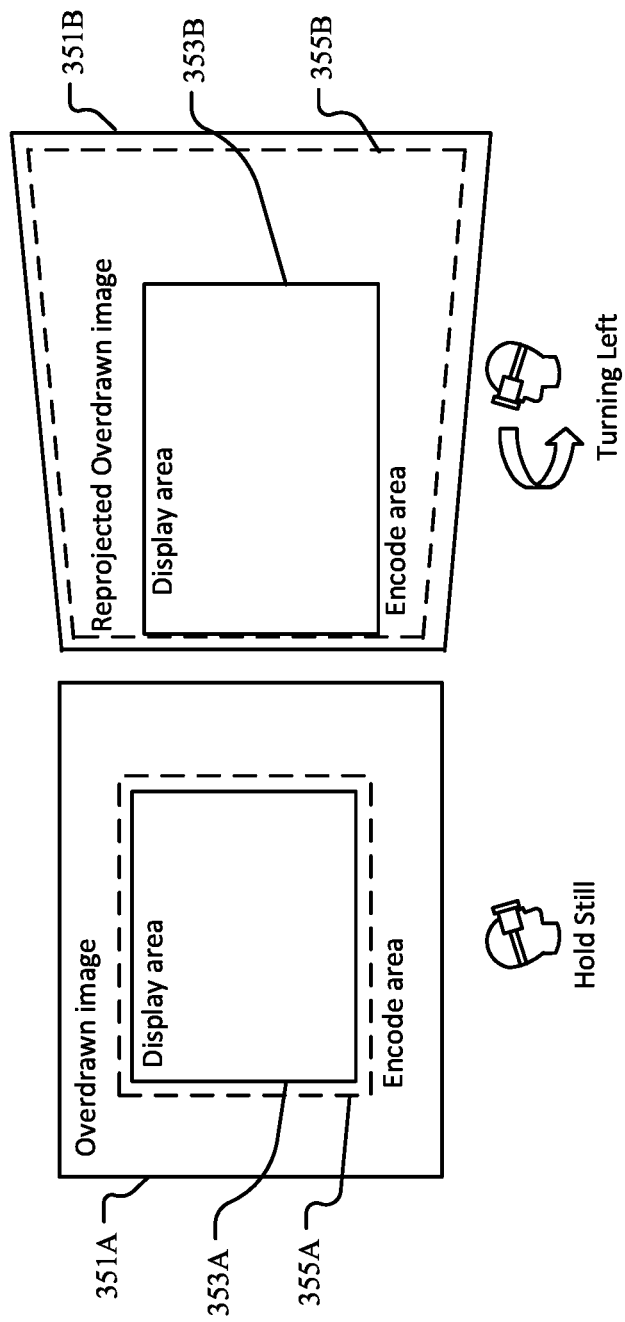
FIG. 3C illustrates deterioration of a person's dynamic visual acuity for the increased speed of a moving object.

As illustrated in FIG. 3C, a person's dynamic visual acuity (DVA) deteriorates for the increased speed of a moving object. For example, encoding the entire overdrawn image with high resolution during fast movement is unnecessary because asynchronous timewarp (ATW) uses only a part of the image and the ability to discriminate small spatial separation decayed when HMD 250 is moved or rotated quickly. As illustrated in FIG. 3C, overdrawn image 351A includes display area 353A enclosed in encode area 355A when the user's head is still, but when the user's head turn left, reprojected overdrawn image 351B move display area 353B and enlarges encode area 355B.

In one embodiment, in response to the movement, such as the user's head turning with respect to HMD 250, angular velocity computation logic 267 of response mechanism 260 at HMD 250 may be used to compute the angular velocity (ω) of HMD 250, where decoding and communication logic 265 then communicates the angular velocity to DTS logic 201 at computing device 100 for further processing. In one embodiment, upon receiving the angular velocity, cropping and resizing logic 211 may then be triggered to calculate the actual field of view for the current frame. The rendered output of this calculation by cropping and resizing logic 211 is then down sampled into the input of an encoder as facilitated by CEA logic 207 as a constant resolution. The impact on losing the resolution of the image may then be omitted since the dynamic visual acuity is also decreased and thus no impact on quality is observed by the user.

In one embodiment, the encoded frame as generated by CEA logic 207 is then sent back to HMD 250 detection and tracking logic 261 through communication/compatibility logic 209 and over communication medium(s) 230. This encoded frame is communicated down to FOV logic 269 which uses this information to dynamically adjust the FOV for display each frame such that this adaptive overdraw resolution significantly improves the efficiency of the codec. This novel technique further allows for reduced processing time for overdraw textures in encoder and decoder as facilitated by CEA logic 207 and decoding and communication logic 265, respectively, without any obvious sacrifice on visual quality along with reducing blank size with little or no latency increment, resulting in improved immersive experience of VR over wireless communication between devices 100, 250.

Further, input component(s) 231 and/or I/O component(s) 270 may further include any number and type of camera(s) 242 and 271, respectively, such as depth-sensing cameras or capturing devices (e.g., Intel® RealSense™ depth-sensing camera) that are known for capturing still and/or video red-green-blue (RGB) and/or RGB-depth (RGB-D) images for media, such as personal media. Such images, having depth information, have been effectively used for various computer vision and computational photography effects, such as (without limitations) scene understanding, refocusing, composition, cinema-graphs, etc. Similarly, for example, displays may include any number and type of displays, such as integral displays, tensor displays, stereoscopic displays, etc., including (but not limited to) embedded or connected display screens, display devices, projectors, etc.

Like computing device 100, other cameras and computing devices, such as camera(s) 271, sensor(s) 273, etc., of HMD 250 in communication with computing device 100 may also include capturing and/or sensing components like those of input components 231 and output components 233, described above and henceforth, including any number and type of cameras as well as other capturing components, sensors, detectors, monitoring tools, speaker devices, display devices, etc.

Input component(s) 231 and/or I/O component(s) 270 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more input component(s) 231 and/or I/O component(s) 270 may further include one or more of supporting or supplemental devices for capturing and/or sensing of data, such as illuminators (e.g., IR illuminator), light fixtures, generators, sound blockers, etc.

It is further contemplated that in one embodiment, input component(s) 231 and/or I/O component(s) 270 may further include any number and type of context sensors (e.g., linear accelerometer) for sensing or detecting any number and type of contexts (e.g., estimating horizon, linear acceleration, etc., relating to a mobile computing device, etc.). For example, input component(s) 231 and/or I/O component(s) 270 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); and gravity gradiometers to study and measure variations in gravitation acceleration due to gravity, etc.

Further, for example, input component(s) 231 and/or I/O component(s) 270 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and/or TEE logic. TEE logic may be employed separately or be part of resource requestor and/or an I/O subsystem, etc. Input component(s) 231 and/or I/O component(s) 270 may further include voice recognition devices, photo recognition devices, facial and other body recognition components, voice-to-text conversion components, etc.

Similarly, output component(s) 233 and/or I/O component(s) 270 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output component(s) 233 and/or I/O component(s) 270 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

It is contemplated that embodiment are not limited to any number or type of use-case scenarios, architectural placements, or component setups; however, for the sake of brevity and clarity, illustrations and descriptions are offered and discussed throughout this document for exemplary purposes but that embodiments are not limited as such. Further, throughout this document, "user" may refer to someone having access to one or more computing devices, such as HMD 250, computing device 100, and may be referenced interchangeably with "person", "individual", "human", "him", "her", "child", "adult", "viewer", "player", "gamer", "developer", programmer", and/or the like.

Communication/compatibility logic 209 may be used to facilitate dynamic communication and compatibility between various components, networks, computing devices 100, 250, database(s) 225, and/or communication medium(s) 230, etc., and any number and type of other computing devices (such as wearable computing devices, mobile computing devices, desktop computers, server computing devices, etc.), processing devices (e.g., central processing unit (CPU), graphics processing unit (GPU), etc.), input components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc.), and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", "circuitry", and/or the like, may be referenced interchangeably and include, by way of example, software, hardware, and/or any combination of software and hardware, such as firmware. In one example, "logic" may refer to or include a software component that to work with one or more of an operating system, a graphics driver, etc., of a computing device, such as computing device 100, HMD 250. In another example, "logic" may refer to or include a hardware component that is capable of being physically installed along with or as part of one or more system hardware elements, such as an application processor, a graphics processor, etc., of a computing device, such as computing device 100, HMD 250. In yet another embodiment, "logic" may refer to or include a firmware component that is capable of being part of system firmware, such as firmware of an application processor or a graphics processor, etc., of a computing device, such as computing device 100, HMD 250.

Further, any use of a particular brand, word, term, phrase, name, and/or acronym, such as "head-mounted display", "VBR", "encoding", "virtual reality", "augmented reality", "asynchronous timewarp", "field of view", "encoding", "decoding", "adjusting encoding rates", "adjusting view", "presenting frame", "next frame size", "latency threshold", "overdrawn image", "reprojecting overdrawn image", "RealSense™ camera", "real-time", "automatic", "dynamic", "user interface", "camera", "sensor", "microphone", "display screen", "speaker", "verification", "authentication", "privacy", "user", "user profile", "user preference", "sender", "receiver", "personal device", "smart device", "mobile computer", "wearable device", "IoT device", "proximity network", "cloud network", "server computer", etc., should not be read to limit embodiments to software or devices that carry that label in products or in literature external to this document.

It is contemplated that any number and type of components may be added to and/or removed from encoding and adapting mechanism 110 and/or response mechanism 260 to facilitate various embodiments including adding, removing, and/or enhancing certain features. For brevity, clarity, and ease of understanding of encoding and adapting mechanism 110 and/or response mechanism 260, many of the standard and/or known components, such as those of a computing device, are not shown or discussed here. It is contemplated that embodiments, as described herein, are not limited to any technology, topology, system, architecture, and/or standard and are dynamic enough to adopt and adapt to any future changes.

FIG. 3A illustrates an architectural setup facilitating a transaction sequence 300 for encoding of video and transmission and presentation of frames according to one embodiment. For brevity, many of the details previously discussed with reference to FIGS. 1-2 may not be discussed or repeated hereafter. Further, embodiments not limited to this illustration of architectural setup or the flow of transaction sequence.

In the illustrated embodiment, computing device 100 and HMD 250 are shown in communication with each other where frames are being presented at HMD 250 through communication of data between computing device 100 and HMD 250. For example, first section 301 of transaction sequence 300 shows first frame 311 being presented at HMD 250 and similarly, second section 303 shows second frame 313 being presented at HMD 250, and third section 305 shows third frame 315 being presented at HMD 250.

It is to be noted and as described above and shown in Table 1, using conventional techniques, for example, third frame 313 would be dropped because the latency (e.g., 12 msec) would be greater than the threshold (e.g., 10 msec) that the system is capable of handling.

In the illustrated embodiment, all three frames 311, 313, 315 are presented such that the VBR encoding rate is adjusted to adjust the latency to, for example, 10 msec to equal the threshold of 10 msec. For example, computing device 100 (also referenced as a transmitter or simply Tx) is shown to have components like graphics render, VBR encoder, wireless radio or receiver, etc., while HMD 250 (also referenced as a receiver or simply Rx) is shown to have components like wireless radio or receiver (10 msec), VBR decoder, etc.

As further illustrated, in one embodiment, HMD motion tracking (v, E) is performed through motion tracking and sensor fusion algorithm, e.g., as facilitated by DTS logic 201 at computing device 100, frame size estimation (S) with current VBR rate is also performed at computing device 100, where latency (L) is then calculated and if the latency is found to be greater than the latency threshold (e.g., L>L_threhold), then VBR encoding rate is adjusted to allow for frames 311, 313, 315 to be presented at HMD 250.

FIG. 3B illustrates an architectural setup 330 facilitating encoding of video and transmission and presentation of frames according to one embodiment. For brevity, many of the details previously discussed with reference to FIGS. 1-3A may not be discussed or repeated hereafter. Further, embodiments not limited to this illustration of architectural setup or the flow of transaction sequence.

As previously discussed with respect to FIGS. 2 and 3A, in the illustrated embodiment, computing system or device 100 (Tx) is shown wirelessly in communication with HMD system or device 250 (Rx) over one or more communication medium(s) 230, such as a proximity network, a cloud network, the Internet, etc. In the illustrated embodiment, computing device 100 hosts encoding and adapting mechanism 110, while HMD 250 hosts response mechanism 260. As illustrated, in one embodiment, encoding and adapting mechanism 100 works with various data and/or components, such as wireless radio 331 (e.g., WiFi, WiGig, etc.), sensor fusion algorithm/application 333, new user pose 335, and video encoder 337 to perform the tasks like computing latency, comparing the latency with threshold, and adjusting the VBR encoding rate and thus the latency to match the threshold to facilitate frame presentation at HMD 250 without skipping or dropping of any frames.

This computing device 100 works in concert with response mechanism 260 and other data and components of HMD 250, such as wireless radio 341, IMU sensor 273, and other HMD components 343. It is contemplated that an IMU sensor is regarded as a self-contained system that measures linear and angular motions typically with a triad of gyroscopes, accelerometers, etc.

For example, IMU sensor 273 monitors and tracks movement associated with HMD 250 and communicates any pertinent movement data (e.g., movement speed, frame size, etc.) to computing device 100 along with wireless radio 341. At computing device 100, sensor fusion algorithm 333 communicates new user pose 335 to encoding and adapting mechanism 110, which is further in communication with wireless radio 331 and video encoder 337 for computing latency and adjusting VBR encoding rates if computed latency is greater than the latency threshold. Further, video frames are communicated from GPU 114 to video encoder 337 to perform the normal or adjusted encoding of the video. This adjusted encoding and latency-based data is then provided back to HMD 250 where response mechanism 260 facilitates video decoder 345 to decode the video and the frame is presented using one or more HMD components 343, such as a display screen.

As already described with reference to FIG. 2, FIG. 3C illustrates deterioration of a person's dynamic visual acuity (DVA) for the increased speed of a moving object.

Figure 3D:
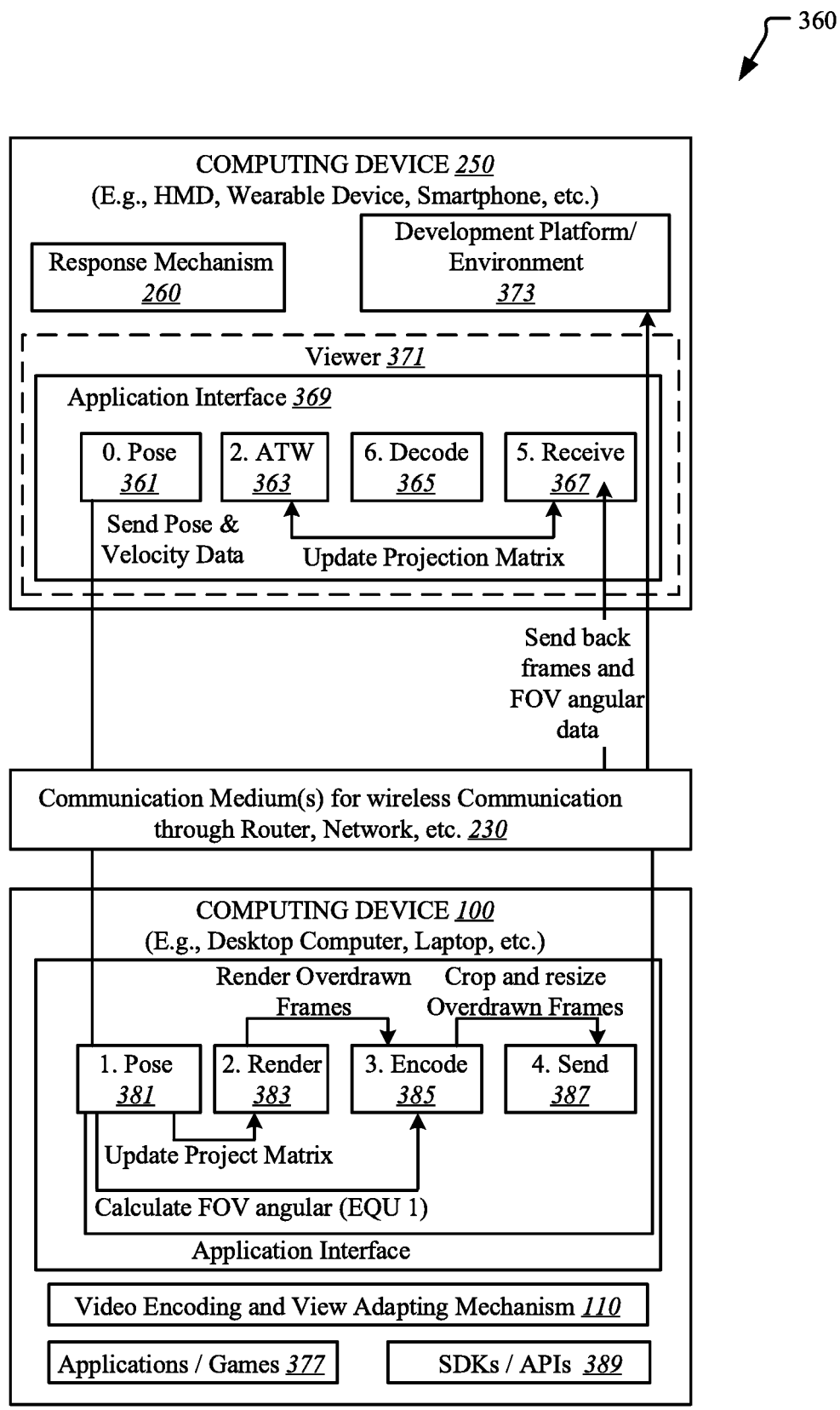
FIG. 3D illustrates an architectural setup for facilitating a transaction sequence for dynamic adaptation of views according to one embodiment.

FIG. 3D illustrates an architectural setup 360 facilitating a transaction sequence for dynamic adaptation of views according to one embodiment. For brevity, many of the details previously discussed with reference to FIGS. 1-3C may not be discussed or repeated hereafter. Further, embodiments not limited to this illustration of architectural setup or the flow of transaction sequence.

In the illustrated embodiment, computing device 100 (e.g., desktops, laptops, etc.) is shown in communication with computing device 250 (e.g., HMDs, other wearable devices, smartphones, other mobile devices, etc.) through wireless communication over communication medium(s) 230 of FIG. 2 using one or more one or more components, such as routers. HMD 250 is further shown to include development platform/environment 373 (e.g., Daydream SDK, etc.) and viewer 371 (e.g., Daydream Viewer, etc.) along with response mechanism 260 as described with reference to FIG. 2. In one embodiment, as facilitated by encoding and adapting mechanism 110, SDKs/APIs 389 (e.g., OpenVR SDK, etc.) at computing device 100 may be used to receive sampled poses 381 through pose and velocity data from pose 361 and render 383 images 383 and then encode 385 images into H.264 bitstream by encoder to then pack and send 387 user datagram protocol (UDP) packages to HMD 250 through wireless communication over communication medium(s) 230.

In one embodiment, upon receiving the packages at HMD 250, response mechanism 260 is triggered to receive 367 and decode 365 the frames and then display each frame after the reprojection or ATW 363. In one embodiment, system latency $t_{lag}$ is measured from pose 0 361 to ATW 7 363, while the HMD angular velocity $\omega_0$ is measured at this moment using one or more IMU sensors of sensor(s) 273 of FIG. 2 on HMD 250. The reprojection then transform the frame to a new orientation, which is calculated as $\Delta\alpha = \alpha_{new} - \alpha_{old}$, where $\alpha_{new}$ is the orientation angle right before the reprojection, while $\alpha_{old}$ is the orientation angle used to render 383 the frame.

It is contemplated that a user moves in a constant angular velocity during one frame interval and thus $\Delta\alpha = \omega_0 * t_{lag}$. When the original frame is reprojected, it necessitates an overdraw area to fill blank edges, such as blank edge 425, as shown in FIG. 4B. As further illustrated in FIG. 4B, $2\phi$ 427 is the original field of view, such as original orientation 421, while $2\theta$ 429 is the overdrawn field of view, such as reprojected orientation 423, where the maximum rotation angular velocity $\omega_{max}$ that reprojection can support is $\omega_{max} = (\theta - \phi) t_{lag}$. If user moves faster than $\omega_{max}$, overdrawn frame 423 cannot fill up all the blank area, such as blank edge 425, and the immersive experience is broken. As the overdrawn $\theta$ grows, the rendered pixels along with system latency $t_{lag}$ also increases, as shown in graph 430 FIG. 4C, and further, the grown frame size significantly increases the encode and texture copy (down sample) time, but slightly increases the render and decode time.

In one embodiment, the render output and down sample are cropped to the original size in order to decrease the encode and copy time, where the crop size is related to angular velocity $\omega_0$, where $\theta_{crop} = \min(\theta, k\omega_0*(t_{lag}+c)+\phi)$, where k and c are empirical factors, where c stands for the hidden latency in the entire loop. For example, an HMD receives the encoded bitstream as well as $\theta_{crop}$ to dynamically adjust the display viewport, where as a result, if a user moves fast, the HMD can reproject a large size, low quality image; otherwise, HMD reprojects a proper size and higher quality image.

Figure 4A:
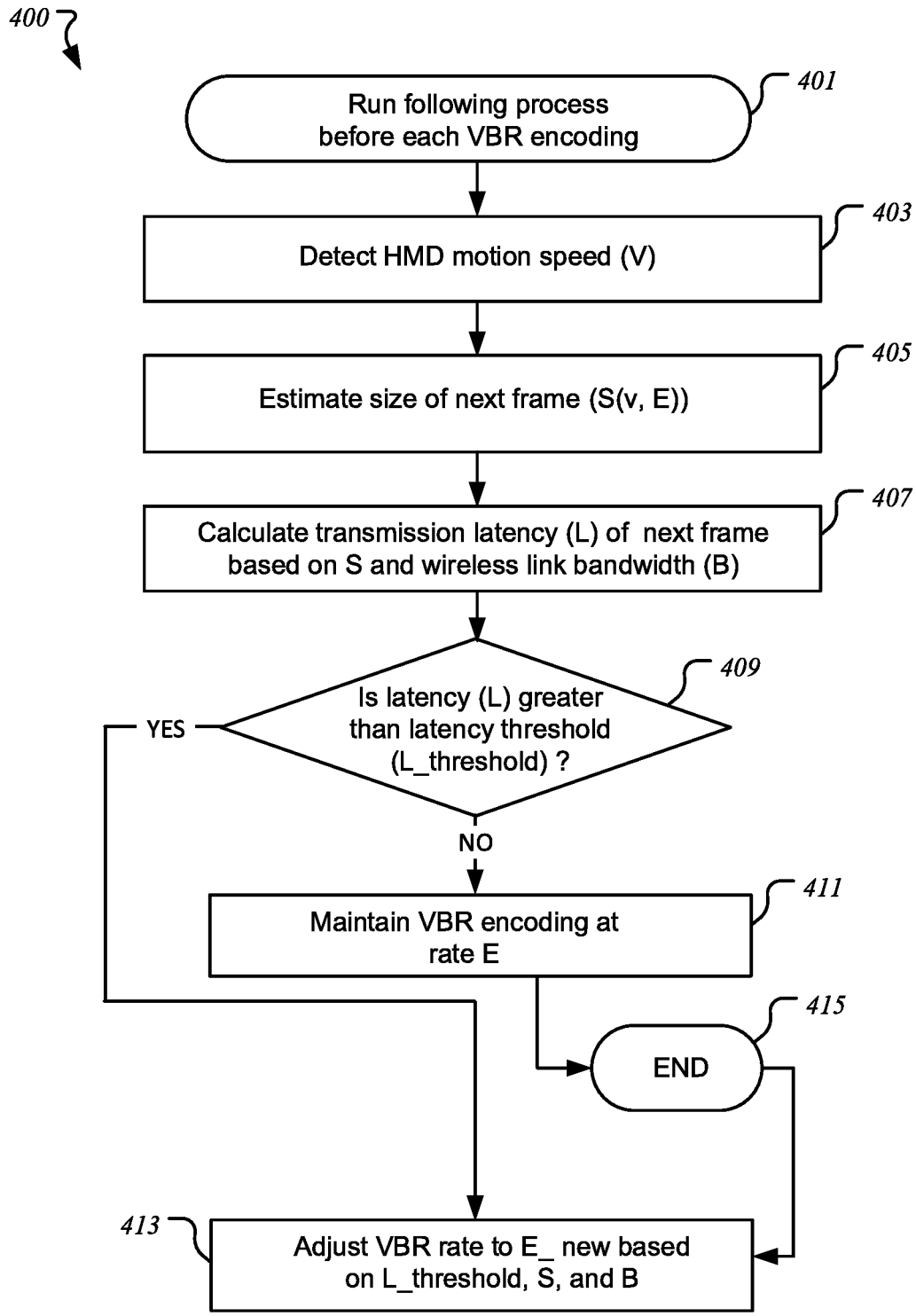
FIG. 4A illustrates a method for smart video encoding adjustments and rendering of frames according to one embodiment.
Figure 4B:
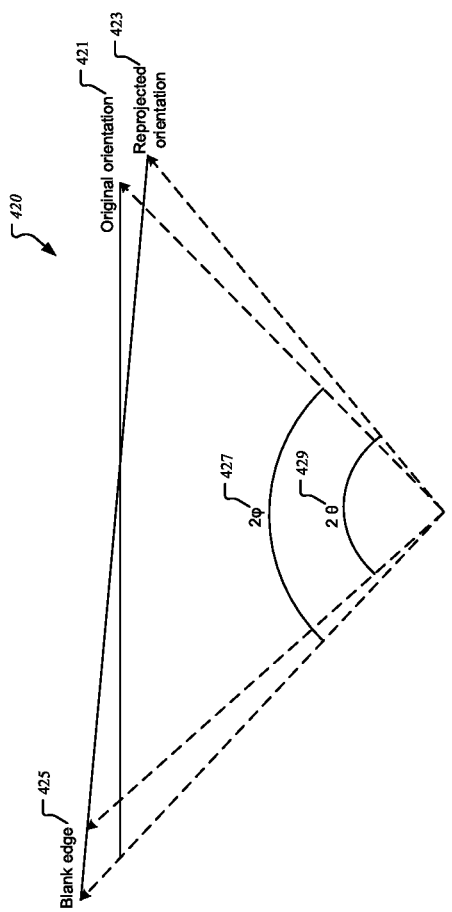
FIG. 4B illustrates reprojection of frames according to one embodiment.

FIG. 4A illustrates a method 400 for smart video encoding adjustments and rendering of frames according to one embodiment. For brevity, many of the details previously discussed with reference to FIGS. 1-3D may not be discussed or repeated hereafter. Any processes or transactions may be performed by processing logic that may comprise hardware (e.g., circuitry, dedicated logic, programmable logic, etc.), software (such as instructions run on a processing device), or a combination thereof, as facilitated by encoding and adapting mechanism 110 of FIG. 1 and response mechanism 260 of FIG. 2. Any processes or transactions associated with this illustration may be illustrated or recited in linear sequences for brevity and clarity in presentation; however, it is contemplated that any number of them can be performed in parallel, asynchronously, or in different orders.

Method 400 begins at block 401 with initiating or running of the following processes before each VBR encoding is performed or finalized as facilitated encoding and adapting mechanism 110 at computing device 100 of FIG. 1. At block 403, HMD motion speed (v) is detected by encoding and adapting mechanism 110 at computing device 100 of FIG. 1. Method 400 continues with block 405 with estimating the size of a next frame (S(v, E)) by response mechanism 260 at HMD 250 of FIG. 2. At block 407, encoding and adapting mechanism 110 at computing device 100 of FIG. 1 performs calculation of transmission latency (L) of the next frame based on size (S) and wireless link bandwidth (B).

In one embodiment, at block 409, a decision is made as to whether the calculated latency (L) is greater than a predetermined latency threshold (L_threshold) as facilitated by encoding and adapting mechanism 110 at computing device 100 of FIG. 1. If not, VBR encoding is maintained at its given rate (E) and the latency remains unchanged and the next frame is presented at block 411 as facilitated by encoding and adapting mechanism 110 at computing device 100 of FIG. 1 and subsequently, method 400 ends at block 415. If, however, the latency (L) is determined to be greater than the threshold, then, at block 413, the VBR encoding rate is adjusted to a new rate (E_new) based on one or more of the latency threshold, size, and bandwidth as facilitated by encoding and adapting mechanism 110 at computing device 100 of FIG. 1, allowing for the next frame to be presented at the HMD and subsequently, method 400 ends at block 415.

As discussed throughout this document, this novel technique describes an act of changing video rates to avoid frame drops and similarly, this novel technique works with the graphics rendering phase such that any background shapes are rendered but with less details and/or texture when an HMD is in high motion and the link bandwidth and/or link latency margins are not sufficient. It is contemplated that there may be other scheduled delays or network activities, such as 1 ms system calibration and 1 ms beamforming, which can further reduce the wireless link latency margin. This novel technique allows for consideration of such factors in predefining the latency threshold, such as L_thresh=L_link-L_systemCalib-L_BF.

As described earlier with respect to FIG. 3D, FIG. 4B illustrates reprojection of frames according to one embodiment.

Figure 4C:
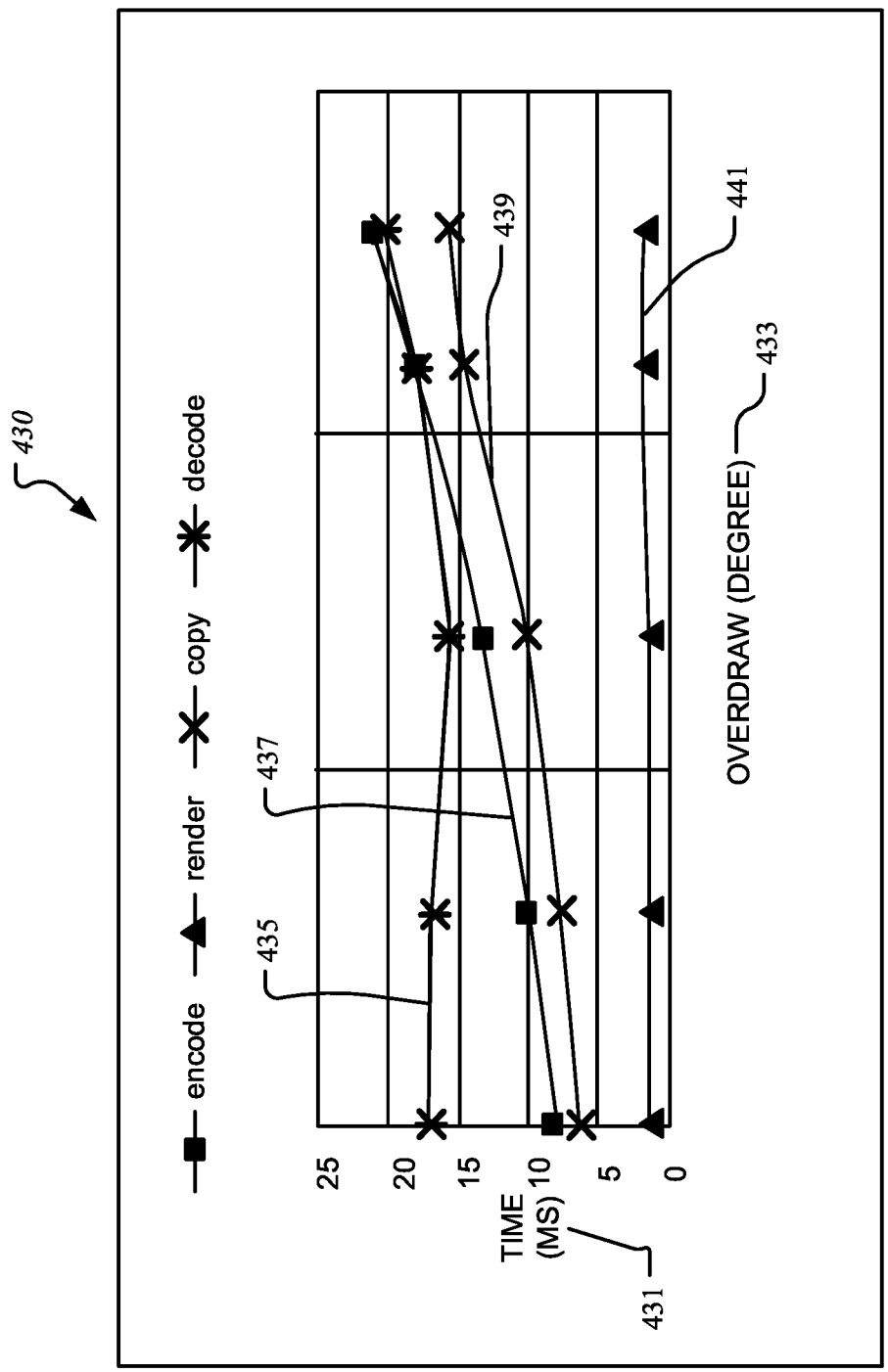
FIG. 4C illustrates graph showing latency details according to one embodiment.

FIG. 4C illustrates graph 430 showing latency details according to one embodiment. For brevity, many of the details previously discussed with reference to FIGS. 1-4B may not be discussed or repeated hereafter. As illustrated, latency details are a relation between time (ms) 431 and overdraw (degrees) 433 as offered and indicated through graph lines representing encoding 435, rendering 437, copying 439, and decoding 441. As described above, this novel technique can offer a wide dynamic FOV without obvious latency increments. For example, this novel technique provides the lower latency as shown in Table 2 below, and dynamic FOV offers the smallest projection blank edge as shown in FIG. 4D.

TABLE 2

| | FOV (degree) | Latency (ms) | | | | |
|---|---|---|---|---|---|---|
| | | Gm 1 | Gm 2 | Gm 3 | Gm 4 | Gm 5 |
| Traditional | 48 | 42.8 | 47.5 | 64.1 | 61.2 | 55.0 |
| | 58 | 69.7 | 90.2 | 84.4 | 70.2 | 73.1 |
| Novel | Dynamic (48-64) | 44.9 | 52.7 | 76.8 | 63.4 | 57.1 |

Figure 4D:
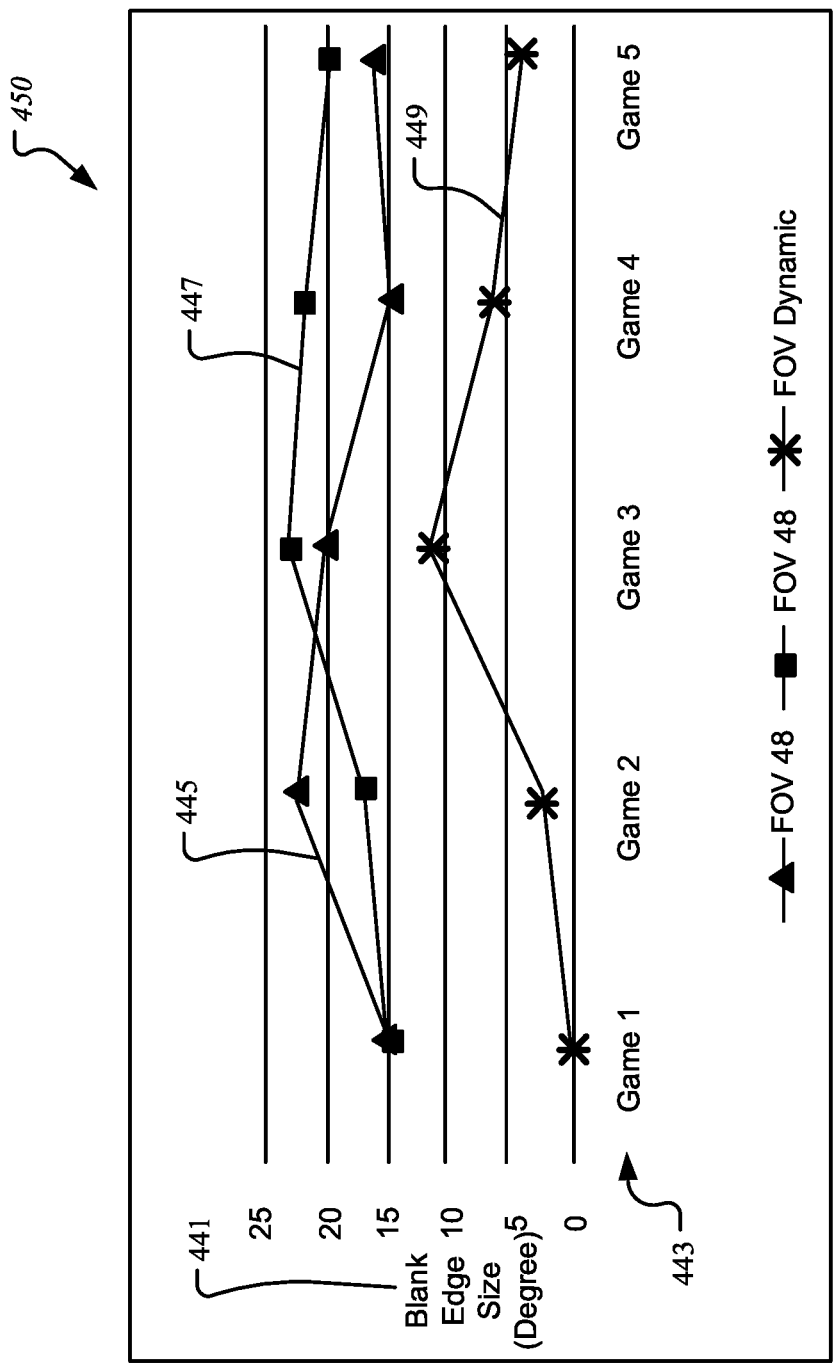
FIG. 4D illustrates graph showing latency details according to one embodiment.

FIG. 4D illustrates graph 440 showing latency details according to one embodiment. For brevity, many of the details previously discussed with reference to FIGS. 1-4C may not be discussed or repeated hereafter. As illustrated, latency details are a relation between blank edge size (degree) 441 and FOV 443. For example, this novel technique allows for a wide dynamic FOV without obvious latency increment, where blank edge size 441 rotates an HMD at an angular velocity of 6 rad/s, offering the smallest reprojection blank edge, such as the conventional FOV 48 445, FOV 58 447, and the novel FOV dynamic 449, which is much lower than FVOs 445, 447.

Figure 4E:
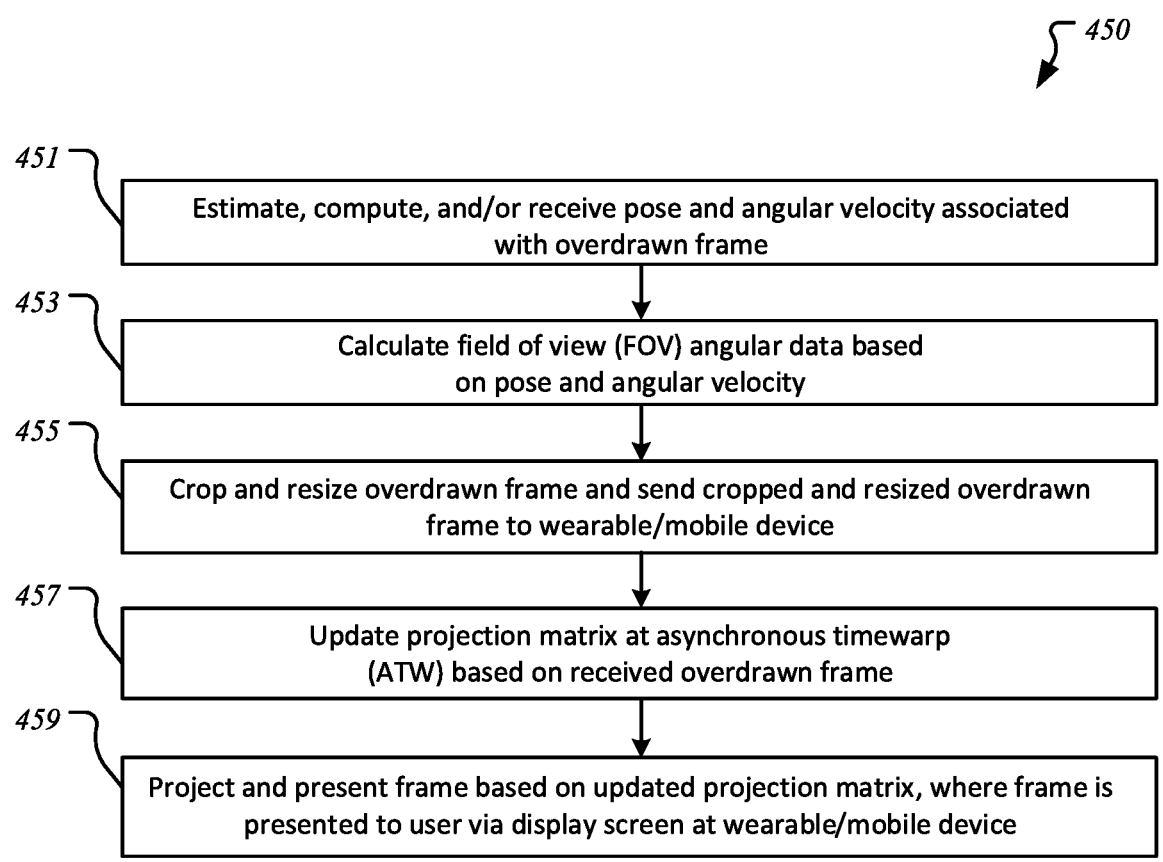
FIG. 4E illustrates a method for smart view adaptation according to one embodiment.

FIG. 4E illustrates a method 450 for smart view adaptation according to one embodiment. For brevity, many of the details previously discussed with reference to FIGS. 1-4D may not be discussed or repeated hereafter. Any processes or transactions may be performed by processing logic that may comprise hardware (e.g., circuitry, dedicated logic, programmable logic, etc.), software (such as instructions run on a processing device), or a combination thereof, as facilitated by encoding and adapting mechanism 110 of FIG. 1 and response mechanism 260 of FIG. 2. Any processes or transactions associated with this illustration may be illustrated or recited in linear sequences for brevity and clarity in presentation; however, it is contemplated that any number of them can be performed in parallel, asynchronously, or in different orders.

Method 450 begins with block 451 with receiving, detecting, and/or estimating of pose and angular velocity data. At block 453, FOV angular data is calculated, and at block 455, any overdrawn frames are cropped and resized. The cropped and resized frames are then sent back to a receive at the second computing device. At block 457, an updated projection matrix provided to ATW at the first computing device. At block 459, the frames are projected and presented to the user via a display screen associated with the HMD.

Figure 5:
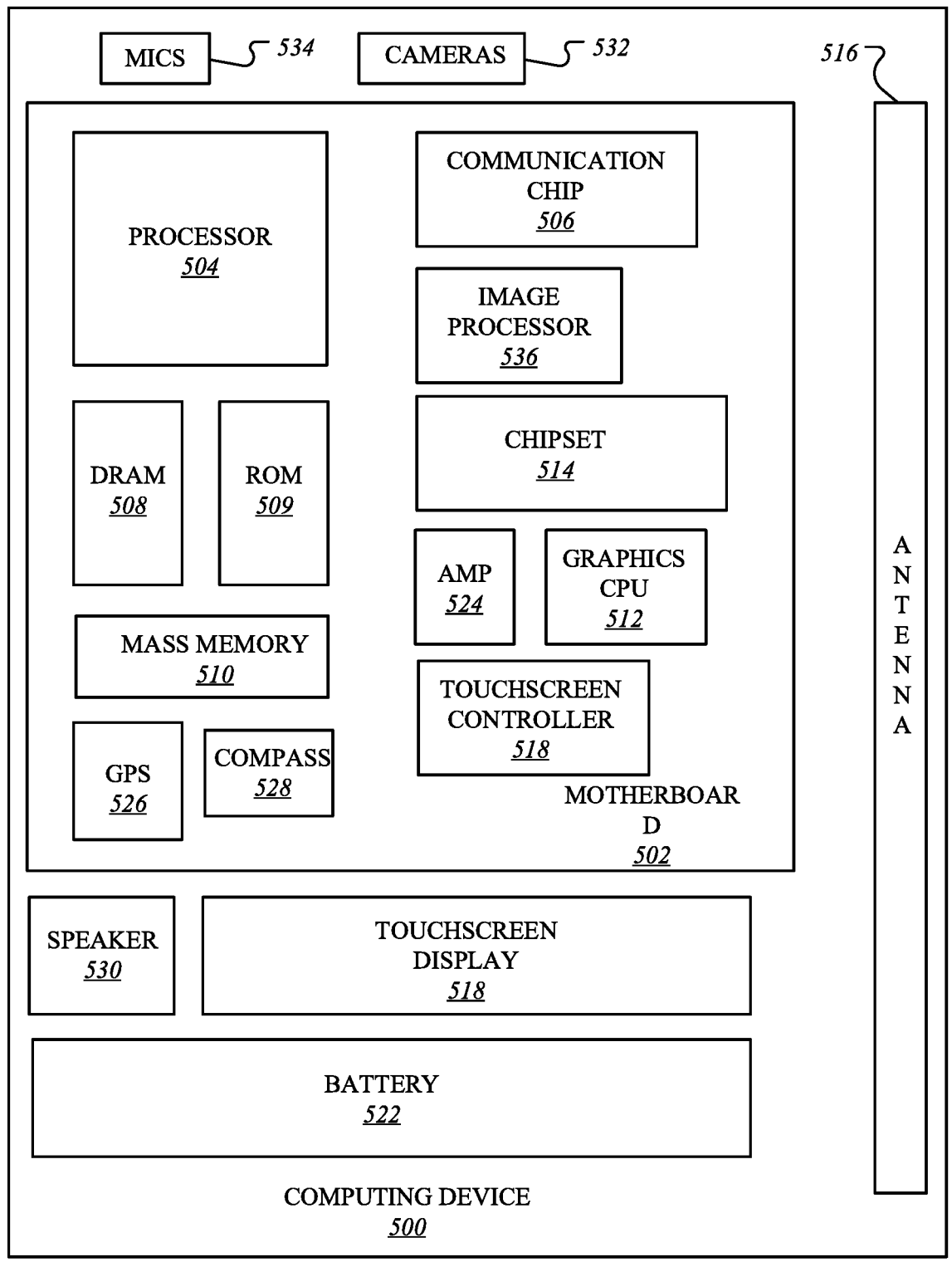
FIG. 5 illustrates a computer device capable of supporting and implementing one or more embodiments according to one embodiment.

FIG. 5 illustrates a computing device 500 in accordance with one implementation. The illustrated computing device 500 may be same as or similar to computing devices 100, 250 of FIG. 2. The computing device 500 houses a system board 502. The board 502 may include a number of components, including but not limited to a processor 504 and at least one communication package 506. The communication package is coupled to one or more antennas 516. The processor 504 is physically and electrically coupled to the board 502.

Depending on its applications, computing device 500 may include other components that may or may not be physically and electrically coupled to the board 502. These other components include, but are not limited to, volatile memory (e.g., DRAM) 508, non-volatile memory (e.g., ROM) 509, flash memory (not shown), a graphics processor 512, a digital signal processor (not shown), a crypto processor (not shown), a chipset 514, an antenna 516, a display 518 such as a touchscreen display, a touchscreen controller 520, a battery 522, an audio codec (not shown), a video codec (not shown), a power amplifier 524, a global positioning system (GPS) device 526, a compass 528, an accelerometer (not shown), a gyroscope (not shown), a speaker 530, cameras 532, a microphone array 534, and a mass storage device (such as hard disk drive) 510, compact disk (CD) (not shown), digital versatile disk (DVD) (not shown), and so forth). These components may be connected to the system board 502, mounted to the system board, or combined with any of the other components.

The communication package 506 enables wireless and/or wired communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 506 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 500 may include a plurality of communication packages 506. For instance, a first communication package 506 may be dedicated to shorter range wireless communications such as Wi-Fi and Bluetooth and a second communication package 506 may be dedicated to longer range wireless communications such as GPS, EDGE, GPRS, CDMA, WiMAX, LTE, Ev-DO, and others.

The cameras 532 including any depth sensors or proximity sensor are coupled to an optional image processor 536 to perform conversions, analysis, noise reduction, comparisons, depth or distance analysis, image understanding, and other processes as described herein. The processor 504 is coupled to the image processor to drive the process with interrupts, set parameters, and control operations of image processor and the cameras. Image processing may instead be performed in the processor 504, the graphics CPU 512, the cameras 532, or in any other device.

In various implementations, the computing device 500 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 500 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Figure 6:
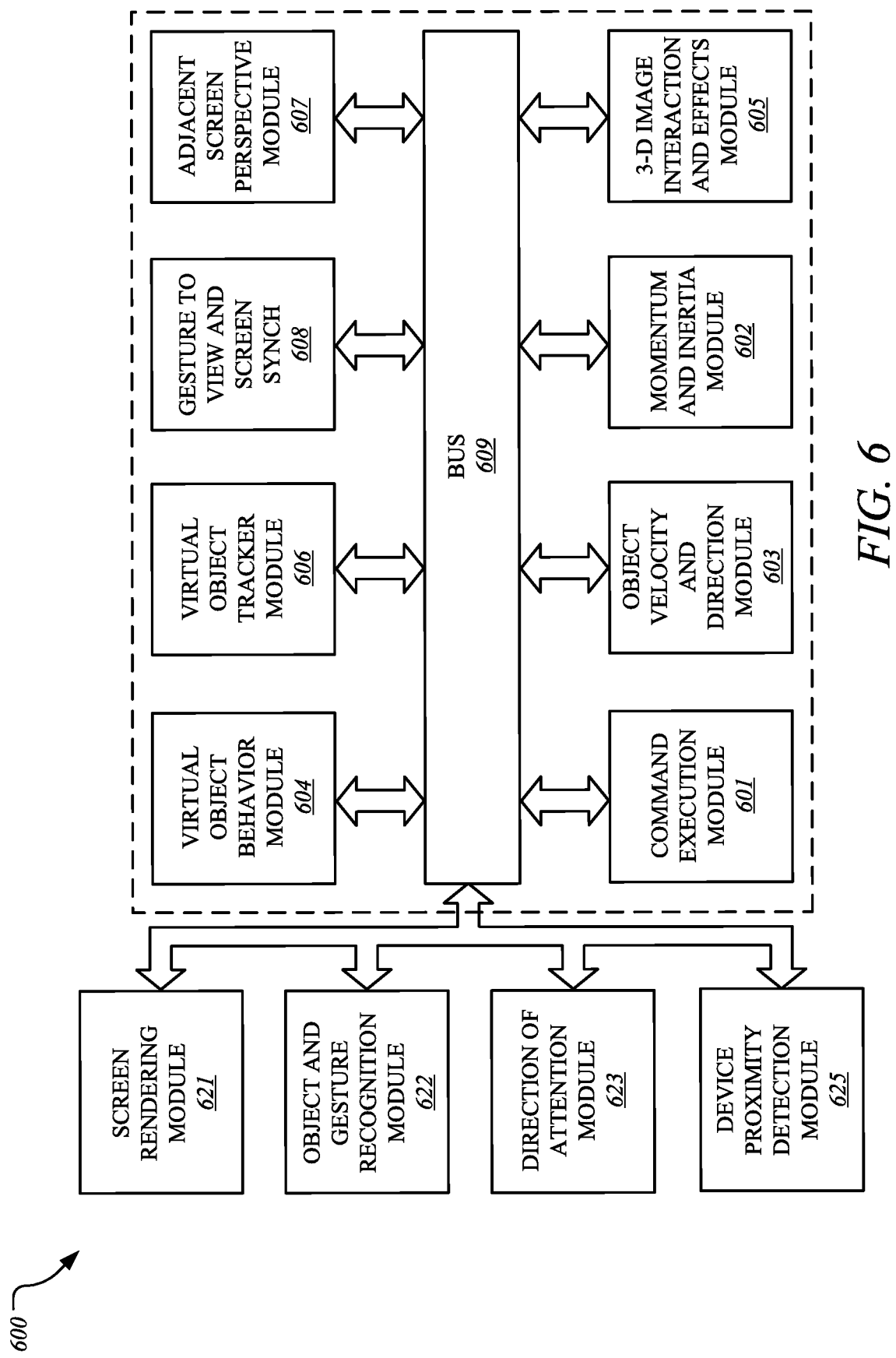
FIG. 6 illustrates an embodiment of a computing environment capable of supporting and implementing one or more embodiments according to one embodiment.

FIG. 6 illustrates an embodiment of a computing environment 600 capable of supporting the operations discussed above. The modules and systems can be implemented in a variety of different hardware architectures and form factors including that shown in FIG. 5.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition Module 622 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition Module 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of a display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition Module 622. Various views of an application on one or more screens can be associated with alternative gesture libraries or a set of gesture templates for a given view. As an example, in FIG. 1A, a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual objects across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition Module 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 601,

602, 603, 604, 605, 606, 607, and 608 are connected via an interconnect or a bus, such as bus 609.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus to facilitate adjustment of video encoding rates and adaption of views, the apparatus comprising: detection, tracking, and selection logic ("DTS logic") to track data associated with movement of a computing device accessible to a user; evaluation and threshold comparison logic to evaluate the data and compare a latency with latency thresholds, wherein the data indicates the latency and the latency thresholds associated with a frame; angular velocity computation, encoding, and adjustment logic ("CEA logic") to maintain a current video encoding rate, if the latency is lower than a first latency threshold and greater than a second latency threshold, wherein the CEA logic to decrease the current video encoding rate, if the latency is equal to or greater than the first latency threshold, wherein the CEA logic to increase the current video encoding rate if the latency is lower than the second latency threshold; and communication/compatibility logic to present the frame at the computing device including one or more of a wearable device and a mobile device.

Example 2 includes the subject matter of Example 1, wherein the data includes one or more of motion speed, estimated frame size, and current video encoding rate, wherein the current video encoding rate is based on variable bit rate, wherein the wearable device includes a head-mounted device, wherein the mobile device includes a smartphone.

Example 3 includes the subject matter of Examples 1-2, wherein the evaluation and threshold logic to estimate the latency threshold based on the data such that that the frame is presented and not skipped at the computing device, wherein the latency is estimated based on estimated frame size, motion speed, and a wireless link throughput, and wherein the latency thresholds are estimated based on one or more of a graphics processor rendering time, video encoding time, video decoding time, wireless network interface device schedule, and device motion-triggered activities including one or more of calibration and beamforming.

Example 4 includes the subject matter of Examples 1-3, wherein the CEA logic to: estimate pose and angular velocity data associated with an overdrawn frame; and calculate field of view (FOV) angular data based on the pose and velocity data associated with the overdrawn frame.

Example 5 includes the subject matter of Examples 1-4, further comprising cropping and resizing logic to crop and resize the overdrawn frame based on the FOV angular data, wherein the CEA logic to adjust the cropped and resized overdrawn frame.

Example 6 includes the subject matter of Examples 1-5, wherein the communication/compatibility logic to communicate the adjusted frame and FOV angular data to the computing device to update projection matrix based on the adjusted frame and the FOV angular data, wherein the adjusted frame is presented based on the projection matrix.

Example 7 includes the subject matter of Examples 1-6, wherein the apparatus is wirelessly in communication with the computing device over a communication medium, wherein the apparatus includes one or more processors including a graphics processor co-located with an application processor on a common semiconductor package.

Some embodiments pertain to Example 8 that includes a method for facilitating adjustment of video encoding rates and adaption of views, the method comprising: tracking, by a first computing device, data associated with movement of a second computing device accessible to a user; evaluating the data and compare a latency with latency thresholds, wherein the data indicates the latency and the latency thresholds associated with a frame; maintaining a current video encoding rate, if the latency is lower than a first latency threshold and greater than a second latency threshold, wherein the current video encoding rate is decreased if the latency is equal to or greater than the first latency threshold, wherein the current video encoding rate is increased if the latency is lower than the second latency threshold; and presenting the frame at the second computing device including one or more of a wearable device and a mobile device.

Example 9 includes the subject matter of Example 8, wherein the data includes one or more of motion speed, estimated frame size, and current video encoding rate, wherein the current video encoding rate is based on variable bit rate, wherein the wearable device includes a head-mounted device, wherein the mobile device includes a smartphone.

Example 10 includes the subject matter of Examples 8-9, further comprising estimating the latency threshold based on the data such that that the frame is presented and not skipped at the computing device, wherein the latency is estimated based on estimated frame size, motion speed, and a wireless link throughput, and wherein the latency thresholds are estimated based on one or more of a graphics processor rendering time, video encoding time, video decoding time, wireless network interface device schedule, and device motion-triggered activities including one or more of calibration and beamforming.

Example 9 includes the subject matter of Examples 8-10, further comprising: estimating pose and angular velocity data associated with an overdrawn frame; and calculating field of view (FOV) angular data based on the pose and velocity data associated with the overdrawn frame.

Example 12 includes the subject matter of Examples 8-11, further comprising: cropping and resizing the overdrawn frame based on the FOV angular data; and adjusting the cropped and resized overdrawn frame.

Example 13 includes the subject matter of Examples 8-12, further comprising communicating the adjusted frame and FOV angular data to the computing device to update projection matrix based on the adjusted frame and the FOV angular data, wherein the adjusted frame is presented based on the projection matrix.

Example 14 includes the subject matter of Examples 8-13, wherein the first computing device is wirelessly in communication with the second computing device over a communication medium, wherein the first computing device includes one or more processors including a graphics processor co-located with an application processor on a common semiconductor package.

Some embodiments pertain to Example 15 that includes a data processing system having a processing device coupled to a memory device, the processing device to: track data associated with movement of a computing device accessible to a user; evaluate the data and compare a latency with latency thresholds, wherein the data indicates the latency and the latency thresholds associated with a frame; maintain a current video encoding rate, if the latency is lower than a first latency threshold and greater than a second latency threshold, wherein the current video encoding rate is decreased if the latency is equal to or greater than the first latency threshold, wherein the current video encoding rate is increased if the latency is lower than the second latency threshold; and present the frame at the computing device including one or more of a wearable device and a mobile device.

Example 16 includes the subject matter of Example 15, wherein the data includes one or more of motion speed, estimated frame size, and current video encoding rate, wherein the current video encoding rate is based on variable bit rate, wherein the wearable device includes a head-mounted device, wherein the mobile device includes a smartphone.

Example 17 includes the subject matter of Examples 15-16, wherein the processing device is further to estimate the latency threshold based on the data such that that the frame is presented and not skipped at the computing device, wherein the latency is estimated based on estimated frame size, motion speed, and a wireless link throughput, and wherein the latency thresholds are estimated based on one or more of a graphics processor rendering time, video encoding time, video decoding time, wireless network interface device schedule, and device motion-triggered activities including one or more of calibration and beamforming.

Example 18 includes the subject matter of Examples 15-17, wherein the processing device is further to: estimate pose and angular velocity data associated with an overdrawn frame; and calculate field of view (FOV) angular data based on the pose and velocity data associated with the overdrawn frame.

Example 19 includes the subject matter of Examples 15-18, wherein the processing device is further to: crop and resize the overdrawn frame based on the FOV angular data; and adjust the cropped and resized overdrawn frame.

Example 20 includes the subject matter of Examples 15-19, wherein the processing device is further to communicate the adjusted frame and FOV angular data to the computing device to update projection matrix based on the adjusted frame and the FOV angular data, wherein the adjusted frame is presented based on the projection matrix.

Example 21 includes the subject matter of Examples 15-20, wherein the data processing system is wirelessly in communication with the second computing device over a communication medium, wherein the processing device includes one or more processors including a graphics processor co-located with an application processor on a common semiconductor package.

Some embodiments pertain to Example 22 that includes an apparatus to facilitate adjustment of video encoding rates and adaption of views, the apparatus comprising: means for tracking data associated with movement of a computing device accessible to a user; means for evaluating the data and compare a latency with latency thresholds, wherein the data indicates the latency and the latency thresholds associated with a frame; means for maintaining a current video encoding rate, if the latency is lower than a first latency threshold and greater than a second latency threshold, wherein the current video encoding rate is decreased if the latency is equal to or greater than the first latency threshold, wherein the current video encoding rate is increased if the latency is lower than the second latency threshold; and means for presenting the frame at the computing device including one or more of a wearable device and a mobile device.

Example 23 includes the subject matter of Example 22, wherein the data includes one or more of motion speed, estimated frame size, and current video encoding rate, wherein the current video encoding rate is based on variable bit rate, wherein the wearable device includes a head-mounted device, wherein the mobile device includes a smartphone.

Example 24 includes the subject matter of Examples 22-23, further comprising means for estimating the latency threshold based on the data such that that the frame is presented and not skipped at the computing device, wherein the latency is estimated based on estimated frame size, motion speed, and a wireless link throughput, and wherein the latency thresholds are estimated based on one or more of a graphics processor rendering time, video encoding time, video decoding time, wireless network interface device schedule, and device motion-triggered activities including one or more of calibration and beamforming.

Example 25 includes the subject matter of Examples 22-24, further comprising: means for estimating pose and angular velocity data associated with an overdrawn frame; and means for calculating field of view (FOV) angular data based on the pose and velocity data associated with the overdrawn frame.

Example 26 includes the subject matter of Examples 22-25, further comprising: means for cropping and resizing the overdrawn frame based on the FOV angular data; and means for adjusting the cropped and resized overdrawn frame.

Example 27 includes the subject matter of Examples 22-26, further comprising means for communicating the adjusted frame and FOV angular data to the computing device to update projection matrix based on the adjusted frame and the FOV angular data, wherein the adjusted frame is presented based on the projection matrix.

Example 28 includes the subject matter of Examples 22-27, wherein the apparatus is wirelessly in communication with the computing device over a communication medium, wherein the apparatus includes one or more processors including a graphics processor co-located with an application processor on a common semiconductor package.

Example 29 includes at least one non-transitory or tangible machine-readable medium comprising a plurality of instructions, when executed on a computing device, to implement or perform a method as claimed in any of claims or examples 8-14.

Example 30 includes at least one machine-readable medium comprising a plurality of instructions, when executed on a computing device, to implement or perform a method as claimed in any of claims or examples 8-14.

Example 31 includes a system comprising a mechanism to implement or perform a method as claimed in any of claims or examples 8-14.

Example 32 includes an apparatus comprising means for performing a method as claimed in any of claims or examples 8-14.

Example 33 includes a computing device arranged to implement or perform a method as claimed in any of claims or examples 8-14.

Example 34 includes a communications device arranged to implement or perform a method as claimed in any of claims or examples 8-14.

Example 35 includes at least one machine-readable medium comprising a plurality of instructions, when executed on a computing device, to implement or perform a method or realize an apparatus as claimed in any preceding claims.

Example 36 includes at least one non-transitory or tangible machine-readable medium comprising a plurality of instructions, when executed on a computing device, to implement or perform a method or realize an apparatus as claimed in any preceding claims.

Example 37 includes a system comprising a mechanism to implement or perform a method or realize an apparatus as claimed in any preceding claims.

Example 38 includes an apparatus comprising means to perform a method as claimed in any preceding claims.

Example 39 includes a computing device arranged to implement or perform a method or realize an apparatus as claimed in any preceding claims.

Example 40 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   one or more processors to:
   track data associated with movement of a computing device accessible to a user;
   evaluate the data and compare a latency with latency thresholds, wherein the data indicates the latency and the latency thresholds associated with a frame, wherein the latency is estimated based on one or more of an estimated frame size, a motion speed, or a wireless link throughput, and wherein the latency thresholds are estimated based on the data such that that the frame is presented and not skipped at the computing device;
   maintain a current video encoding rate, if the latency is lower than a first latency threshold and greater than a second latency threshold;
   decrease the current video encoding rate, if the latency is equal to or greater than the first latency threshold;
   increase the current video encoding rate if the latency is lower than the second latency threshold; and
   present the frame at the computing device including a wearable device or a mobile device.

2. The apparatus of claim 1, wherein the data includes one or more of the motion speed, the estimated frame size, and a current video encoding rate, wherein the current video encoding rate is based on variable bit rate, wherein the wearable device includes a head-mounted device, wherein the mobile device includes a smartphone.

3. The apparatus of claim 2,
   wherein the latency thresholds are estimated based on one or more of a graphics processor rendering time, video encoding time, video decoding time, wireless network interface device schedule, and device motion-triggered activities including one or more of calibration and beamforming.

4. The apparatus of claim 1, wherein the one or more processors are further to:
   estimate pose and angular velocity data associated with an overdrawn frame; and
   calculate field of view (FOV) angular data based on the pose and velocity data associated with the overdrawn frame.

5. The apparatus of claim 4, wherein the one or more processors are further to crop and resize the overdrawn frame based on the FOV angular data, and adjust the cropped and resized overdrawn frame.

6. The apparatus of claim 5, wherein the one or more processors are further to communicate the adjusted frame and FOV angular data to the computing device to update projection matrix based on the adjusted frame and the FOV angular data, wherein the adjusted frame is presented based on the projection matrix.

7. The apparatus of claim 1, wherein the apparatus is wirelessly in communication with the computing device over a communication medium, wherein the apparatus includes one or more processors including a graphics processor co-located with an application processor on a common semiconductor package.

8. A method comprising:
   tracking, by a first computing device, data associated with movement of a second computing device accessible to a user;
   evaluating the data and compare a latency with latency thresholds, wherein the data indicates the latency and the latency thresholds associated with a frame, wherein the latency is estimated based on one or more of an estimated frame size, a motion speed, or a wireless link throughput, and wherein the latency thresholds are estimated based on the data such that that the frame is presented and not skipped at the computing device;
   maintaining a current video encoding rate, if the latency is lower than a first latency threshold and greater than a second latency threshold,
   wherein the current video encoding rate is decreased if the latency is equal to or greater than the first latency threshold,
   wherein the current video encoding rate is increased if the latency is lower than the second latency threshold; and
   presenting the frame at the second computing device including one or more of a wearable device or a mobile device.

9. The method of claim 8, wherein the data includes one or more of the motion speed, the estimated frame size, or a current video encoding rate, wherein the current video encoding rate is based on variable bit rate, wherein the wearable device includes a head-mounted device, wherein the mobile device includes a smartphone.

10. The method of claim 9,
    wherein the latency thresholds are estimated based on one or more of a graphics processor rendering time, video encoding time, video decoding time, wireless network interface device schedule, and device motion-triggered activities including one or more of calibration and beamforming.

11. The method of claim 8, further comprising:
estimating pose and angular velocity data associated with an overdrawn frame; and
calculating field of view (FOV) angular data based on the pose and velocity data associated with the overdrawn frame.

12. The method of claim 11, further comprising:
cropping and resizing the overdrawn frame based on the FOV angular data; and
adjusting the cropped and resized overdrawn frame.

13. The method of claim 12, further comprising communicating the adjusted frame and FOV angular data to the computing device to update projection matrix based on the adjusted frame and the FOV angular data, wherein the adjusted frame is presented based on the projection matrix.

14. The method of claim 8, wherein the first computing device is wirelessly in communication with the second computing device over a communication medium, wherein the first computing device includes one or more processors including a graphics processor co-located with an application processor on a common semiconductor package.

15. A non-transitory computer-readable medium having stored thereon instructions which, when executed by a first computing device, causes the first computing device to facilitate operations comprising:
tracking data associated with movement of a second computing device accessible to a user;
evaluating the data and compare a latency with latency thresholds, wherein the data indicates the latency and the latency thresholds associated with a frame, wherein the latency is estimated based on one or more of an estimated frame size, a motion speed, or a wireless link throughput, and wherein the latency thresholds are estimated based on the data such that that the frame is presented and not skipped at the computing device;
maintaining a current video encoding rate, if the latency is lower than a first latency threshold and greater than a second latency threshold,
wherein the current video encoding rate is decreased if the latency is equal to or greater than the first latency threshold,
wherein the current video encoding rate is increased if the latency is lower than the second latency threshold, and
presenting the frame at the second computing device including a wearable device or a mobile device.

16. The non-transitory computer-readable medium of claim 15, wherein the data includes one or more of the motion speed, the estimated frame size, and a current video encoding rate, wherein the current video encoding rate is based on variable bit rate, wherein the wearable device includes a head-mounted device, wherein the mobile device includes a smartphone.

17. The non-transitory computer-readable medium of claim 15,
wherein the latency thresholds are estimated based on one or more of a graphics processor rendering time, video encoding time, video decoding time, wireless network interface device schedule, and device motion-triggered activities including one or more of calibration and beamforming.

18. The non-transitory computer-readable medium of claim 15, wherein the operations comprise:
estimating pose and angular velocity data associated with an overdrawn frame; and
calculating field of view (FOV) angular data based on the pose and velocity data associated with the overdrawn frame.

19. The non-transitory computer-readable medium of claim 18, wherein the operations comprise:
cropping and resizing the overdrawn frame based on the FOV angular data; and
adjusting the cropped and resized overdrawn frame.

20. The non-transitory computer-readable medium of claim 19, further comprising communicating the adjusted frame and FOV angular data to the computing device to update projection matrix based on the adjusted frame and the FOV angular data, wherein the adjusted frame is presented based on the projection matrix.

21. The non-transitory computer-readable medium of claim 15, wherein the first computing device is wirelessly in communication with the second computing device over a communication medium, wherein the first computing device includes one or more processors including a graphics processor co-located with an application processor on a common semiconductor package.

* * * * *